Patented July 12, 1949

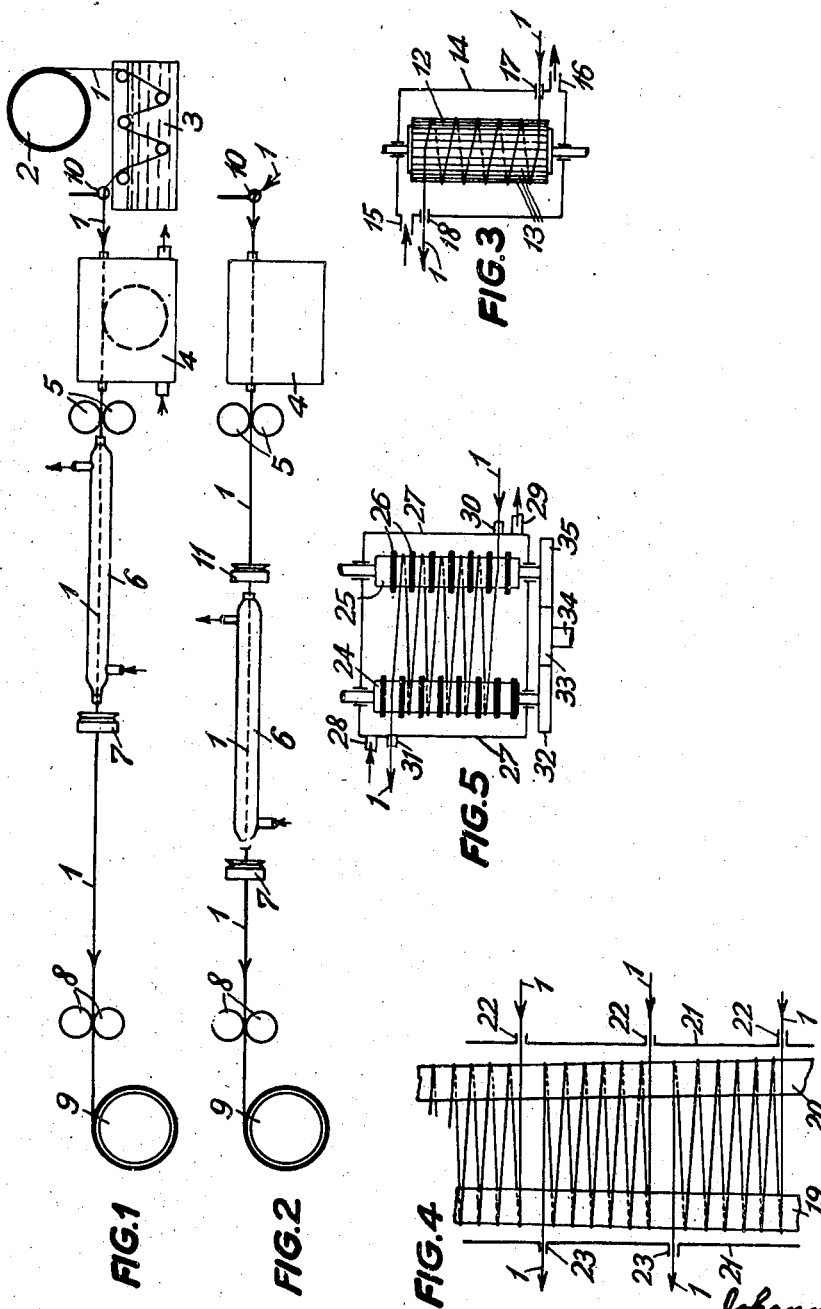

2,475,922

UNITED STATES PATENT OFFICE 2,475,922

PROCESS AND DEVICE FOR PRODUCING WOOL-LIKE RAYON FILAMENTS

Johann Stockly, Zurich, Switzerland

Application February 6, 1946, Serial No. 645,942
In Switzerland February 7, 1945

6 Claims. (Cl. 57—1)

In the Swiss patent specification 233,148 an apparatus has been described which permits of transforming an endless rayon filament, in particular of the viscose or copper type, into a wool-like frizzled yarn of great filling capacity in a single operation. The said apparatus comprises a filament pay-out tackle, an impregnating device, a filament feed, a drier, a positively driven twister, a recond filament feed, and a winder.

According to the pending U. S. application Ser. No. 645,941, the apparatus and method indicated above are improved by additionally interposing, between the first filament feed and the tubular drying duct, a second similar twister running in the opposite sense of the first twister.

The filament may be pre-impregnated by means of water or aqueous solutions, which may also contain products of pre-condensation or pre-polymerization or components thereof, to improve the fixation of the filament in its frizzled form.

It has been found that it is not necessary to carry out the entire drying process in the tubular drying duct, nor to twist the entire piece of filament to be dried. Tests have shown that it is mainly the last portion only of the filament to be dried which is decisive for the frizzling, and that it is sufficient to twist same substantially. It is just this last portion of the filament, on which the ingredients of the impregnating solution act with full force.

I have succeeded in sectionalizing the process as follows: The filament is continuously impregnated as a single filament and wound up, or the filament already present in wound form (cake, cheese, tube, cone) is treated with the impregnating solution. The impregnated cakes then are dried, after centrifugeing, in a conditioning chamber of appropriate humidity down to approximately 50% water content, relative to the filament dry matter. The moist cakes or cones then are fed to the frizzling device which comprises a tubular drying duct and a plurality of twisters.

According to my present invention, therefore, the drying process is subdivided into two parts, and a substantial portion—in certain cases the main portion—of the water is expelled from the pre-impregnated filament even before the latter reaches the tubular drying duct. One may proceed here by first predrying the initially non-twisted or only slightly twisted filament in a continuously operating drying device, after the impregnation and a possible wringing, and then completely dry same while false-twisting it. In this way, as has been proved, I succeed in re-coming the greater part, often up to 75%, of the impregnating water, or to a water content of not less than 50%, prior to the drying process proper, and in a relatively economical manner, without materially impairing the frizzling effect subsequently to be brought about by false twisting and drying proper.

For predrying one may use, in accordance with my present invention, a drying device comprising a heated rotating filament-transport gear which is capable of taking up a greater length of filament in a plurality of loops and windings.

So-called stagger reels have proved satisfactory as filament-transport gear for the purposes of the present invention, as disclosed in the German patent specifications 236,584, 239,822 and 415,479; wherein the filament is staggered and moved on, in the direction of the reel axis and in helical windings, by the driven reel which is provided with actuated battens; or wherein the reel rungs formed of ropes are themselves moved in the direction of the reel axis.

Crossed-roller pairs, known per se, also have proved satisfactory for the present purpose, wherein the filament is laid about the roller pair, moved on and staggered in helical windings in the direction of the reel axis, by virtue of the inclination of the two rollers rotated in the same sense.

Ribbed, parallel, driven roller pairs also have proved very satisfactory, about which the filament is wound helically from groove to groove.

The positively driven filament-transport gears are capable, in the present system, of taking the place of the first filament feed.

The said filament-transport gears, for heating purposes, may be enclosed in an accessible chamber charged and scavenged by hot air or other hot gases or vapors and equipped with the suitable passage openings for the filament and heating medium, as well as with the necessary movable or detachable masks or other auxiliary means for threading the yarn. While one may use in the subsequent drying tube hot air of 120–130° C., whereby the filament is dried relatively quickly, it is recommended, as has been ascertained, to hold the temperature of the pre-drier rather lower, and to increase the number of windings instead, thus positively preventing too strong or non-uniform a predrying.

It has not proved necessary to associate a separate predrier having a filament-transport gear of its own with each place of operation or with each filament respectively. The predriers may be aggregated to serve a plurality of working places. A common stagger reel, a common crossed-roller pair of a common ribbed roller pair may be used for a plurality of filaments. The casing also may be combined for a plurality of working places. Irrespective thereof, the provision of an individual movable mask, for service and threading purposes, in the casing is to be recommended.

An operational aggregate for carrying out the process described, as well as a plurality of embodiments of predrier, will now be dealt with in some detail with reference to the accompanying drawing.

In the drawing:

Fig. 1 shows a diagrammatic view of the apparatus according to the invention, using one twister.

Fig. 2 shows a diagrammatic view of the apparatus according to the invention, using two twisters.

Fig. 3 shows a plan view, partly in section, of a predrier with a stagger reel.

Fig. 4 shows a similar view of a predrier with a cross roller pair.

Fig. 5 shows a similar view of a predrier with a pair of ribbed rollers.

Fig. 1 represents the total apparatus when using a single false-twister. It essentially comprises a filament pay-out tackle 2, an impregnating tub 3, a predrier 4 which also may serve as filament feed, the filament feed 5, the tubular drying duct 6, the positively driven twister 7, the filament feed 8, and the reel 9. As an auxiliary, the filament guide 10 may be used.

Fig. 2 represents the total apparatus when using two twisters rotating in different sense, of which the first 11 is interposed after the predrier 4, but immediately before the drying device 6, while the second immediately succeeds the latter device.

Fig. 3 illustrates a predrier with a stagger reel 12, the movements of the reel rungs 13 causing a helical movement of the filament 1 over the reel face. The reel is housed within a case 14 which is provided with an inlet 15 and outlet 16 for the heating gases and an inlet 17 and outlet 18 for the filament.

Fig. 4 shows a predrier with a driven crossed-roller pair 19, 20 acting as filament-transport gear. The rollers are slightly inclined toward each other, whereby the filaments 1, laid over the rollers, are forced to pass along helical lines. The casing 21, which covers a plurality of working places, is provided with the passage openings 22 and 23 for the filaments 1.

Fig. 5 shows a predrier in form of a heated, parallel, ribbed and positively driven pair of rollers 24, 25.

The slightly projecting flanges 26 are staggered on the two rollers so that a helix is formed by the filament 1 riding thereon. The individual working place possesses a casing 27 of its own with the inlet 28 and outlet 29 for the heating medium, and the inlet 30 and outlet 31 for the filament 1. The rollers may extend over a plurality of working places. A gear mechanism 32—35 for the combined drive of the two rollers is provided at the head of the apparatus.

What I claim and desire to secure by Letters Patent is:

1. An apparatus producing wool-like twist in rayon filaments comprising, a tubular drying duct, at least one filament twister, and a heated rotatable filament-supporting transport means for accommodating the filament in loops or windings; the said transport means also serving as a predrier and being located before the twister considered with respect to the course of travel of a filament through the apparatus.

2. Apparatus according to claim 1, and in which the heated rotatable transport means comprises a positively driven stagger reel.

3. Apparatus according to claim 1, and in which the heated rotatable transport means comprises a positively driven crossed-roller pair.

4. Apparatus according to claim 1, and in which the heated rotatable transport means comprises a positively driven ribbed roller pair.

5. Apparatus according to claim 1, and a casing enclosing the transport means for containing heated gaseous drying medium.

6. A continuous process of producing wool-like rayon filaments of the cellulose hydrate type, comprising the steps of swelling the filaments by impregnation, reducing the water contents to about 50%, giving the filaments a false twist and further drying the filaments while being twisted.

JOHANN STOCKLY.

REFERENCES CITED

The following references are of record in the file of this patent:

UNITED STATES PATENTS

| Number | Name | Date |
|---|---|---|
| 777,696 | Rhodes | Dec. 20, 1904 |
| 2,089,198 | Finlayson et al. | Aug. 10, 1937 |
| 2,089,239 | Whitehead | Aug. 10, 1937 |
| 2,363,871 | Keen et al. | Nov. 28, 1944 |